US009168829B2

(12) United States Patent
Dong et al.

(10) Patent No.: US 9,168,829 B2
(45) Date of Patent: Oct. 27, 2015

(54) VAPOR STORAGE DEVICE HAVING A DIFFUSER PLATE AND DOME

(71) Applicant: Ford Global Technologies, LLC, Dearborn, MI (US)

(72) Inventors: Mike Dong, Ann Arbor, MI (US); Niels Christopher Kragh, Commerce Township (MA); Michael G. Heim, Brownstown, MI (US); Dhaval P. Vaishnav, Canton, MI (US); Mohammad Usman, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 13/944,762

(22) Filed: Jul. 17, 2013

(65) Prior Publication Data

US 2015/0021407 A1    Jan. 22, 2015

(51) Int. Cl.
| | |
|---|---|
| *F02M 33/02* | (2006.01) |
| *B60K 15/03* | (2006.01) |
| *B01D 53/04* | (2006.01) |
| *F02M 25/08* | (2006.01) |
| *B60K 15/04* | (2006.01) |

(52) U.S. Cl.
CPC .......... *B60K 15/03006* (2013.01); *B01D 53/04* (2013.01); *B60K 15/04* (2013.01); *F02M 25/0854* (2013.01)

(58) Field of Classification Search
CPC .. B60K 15/03006; B60K 15/04; F02M 25/08; F02M 25/0854; B01D 53/04; B01D 2257/702

USPC .......................... 95/146; 96/139, 152; 123/519
See application file for complete search history.

(56) References Cited

U.S. PATENT DOCUMENTS

| | | | | |
|---|---|---|---|---|
| 3,831,353 | A * | 8/1974 | Toth | 96/144 |
| 4,308,840 | A * | 1/1982 | Hiramatsu et al. | 123/519 |
| 4,448,594 | A * | 5/1984 | Kozawa | 96/130 |
| 4,717,401 | A * | 1/1988 | Lupoli et al. | 96/141 |
| 4,750,923 | A * | 6/1988 | Haruta et al. | 96/141 |
| 4,826,513 | A * | 5/1989 | Stackhouse et al. | 96/131 |
| 5,718,209 | A * | 2/1998 | Scardino et al. | 123/519 |
| 5,779,773 | A * | 7/1998 | Cam et al. | 96/152 |
| 6,321,726 | B1 | 11/2001 | Khami et al. | |
| 7,491,259 | B2 * | 2/2009 | Buchelli et al. | 95/90 |

(Continued)

FOREIGN PATENT DOCUMENTS

| | | |
|---|---|---|
| CN | 102678396 A | 9/2012 |
| JP | 04-029714 A * | 1/1992 |
| JP | 2013057281 A | 3/2013 |

OTHER PUBLICATIONS

Kragh Niels Christopher et al., "Evaporative Emission Control," U.S. Appl. No. 13/670,675, filed Nov. 7, 2012, 42 pages.

*Primary Examiner* — Frank Lawrence
(74) *Attorney, Agent, or Firm* — James Dottavio; Alleman Hall McCoy Russell & Tuttle LLP

(57) ABSTRACT

A vapor storage device is provided. The vapor storage device includes a diffuser plate positioned on an axis of an inlet port and comprising one or more openings extending through the plate from a leading edge to a trailing edge and a dome coupled to the inlet port of the device and the diffuser plate, where the dome includes side walls spaced away from the diffuser plate.

20 Claims, 7 Drawing Sheets

(56) References Cited

U.S. PATENT DOCUMENTS

| | | |
|---|---|---|
| 8,246,729 B2 | 8/2012 | Defilippi et al. |
| 2005/0188850 A1* | 9/2005 | Allen et al. .................... 96/152 |
| 2007/0272080 A1* | 11/2007 | Allen et al. .................... 96/134 |
| 2009/0056827 A1 | 3/2009 | Tschantz |
| 2009/0101119 A1 | 4/2009 | Ammermann |
| 2010/0307463 A1 | 12/2010 | Peters et al. |
| 2011/0139129 A1 | 6/2011 | Lang et al. |
| 2011/0155107 A1 | 6/2011 | Lin et al. |
| 2011/0315126 A1 | 12/2011 | Yoshida et al. |
| 2012/0318814 A1 | 12/2012 | Walter |
| 2013/0037007 A1 | 2/2013 | Reddy |
| 2013/0291734 A1* | 11/2013 | Lin et al. ...................... 96/134 |

\* cited by examiner

VAPOR STORAGE DEVICE HAVING A DIFFUSER PLATE AND DOME

FIELD

The present disclosure relates to a vapor storage device and method for operation of a vapor storage device in a vehicle system.

BACKGROUND AND SUMMARY

Vapor storage canister, such as carbon canisters, are used in vehicles to reduce vapor emissions caused by temperature changes in the vehicle. For instance, temperature shifts in the fuel tank which may be caused by diurnal cycles, heat rejection from underbody components such as exhaust pipe and/or hot return fuel from engine can generate fuel vapors in the fuel delivery system. Fuel vapor is also generated during refueling because of air entrainment with liquid fuel, turbulence and temperature difference between tank fuel and fresh fuel. Furthermore for hybrid vehicles, fuel tank is sealed at high pressure. This pressure is released rapidly during refueling. This pressure change can also cause vapor generation. The fuel vapors may leak or permeate from the fuel tank if not properly sequestered. Therefore, in some vehicles fuel vapors are routed to carbon canisters for temporary storage to reduce emissions. The fuel vapors may be subsequently purged during certain operating conditions to prevent overfilling of the vapor storage canister. During purging operation fresh air is introduced into the canister causing desorption of the fuel vapors from the carbon in the canister. Then the mixture of air and fuel vapor is routed into engine via an intake system where they are combusted.

U.S. Pat. No. 8,246,729 discloses a fuel vapor storing device having a tubular diffuser with plurality of openings providing air into the device during purging. However, the fuel vapor storing device disclosed in U.S. Pat. No. 8,246,729 does not provide a desired amount of flow distribution in the device during purging. Specifically, the tubular diffuser may not generate flow patterns which evenly distribute the airflow through the device when purged. The tubular/annular diffuser described in aforementioned patent also increases pressure drop across canister because of narrow flow passages and flow turning. As a result, the desorption rate of fuel vapor into the intake air may be decreased during period of high inlet airflow. Consequently, there may be trade-offs between purging efficiency (e.g., the amount of fuel vapor purged from the canister per volumetric airflow) and the flow-rate of air during purging. As a result, a desired amount of fuel vapor may not be purged from the device in a desired period of time, preventing the device from being completely purged. Consequently, the device may reach maximum vapor storage, thereby increasing fuel vapor emission from the vehicle. This may be particularly problematic in plug-in electric hybrid vehicles (PHEV) where high purge rates are desired due to the limited window of engine combustion operation in the vehicle.

The inventors herein have recognized the above issues and developed a vapor storage device. The vapor storage device includes a diffuser plate positioned on an axis of an inlet port and comprising one or more openings extending through the plate from a leading edge to a trailing edge and a dome coupled to the inlet port of the device and the diffuser plate, where the dome includes side walls spaced away from the diffuser plate.

The dome and the diffuser plate enable uniform flow distribution even at high air flow rate in the canister while purging fuel vapor when compared to previous canisters which do not include domes or diffuser plates. Moreover, the dome and the diffuser plate do not unduly increase pressure losses in the device. Therefore, air may be introduced into the device during purging at a high flow rate while achieving a desirable fuel desorption rate. Consequently, diurnal and/or resting loss emissions are reduced and fuel economy is enabled in the vehicle in which the vapor storage device is included. Therefore, it will be appreciated that the technical results achieved by the vapor storage device include achieving uniform flow distribution of high velocity intake air introduced into the vapor storage device without unduly increased pressure losses in the device, thereby decreasing the amount of time needed to purge the device.

The above advantages and other advantages, and features of the present description will be readily apparent from the following Detailed Description when taken alone or in connection with the accompanying drawings.

It should be understood that the above summary is provided to introduce a selection of concepts in simplified form. These concepts are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIGS. 2-15 and 17-19 are drawn approximately to scale, however other relative dimensions may be used if desired.

DETAILED DESCRIPTION

A vapor storage device is described herein. A dome and a diffuser plate in the device enables fresh air to be introduced into the device at a high flowrate while maintaining a high desorption rate of fuel vapor into the air passing through the device via an improvement in the distribution of airflow throughout the device. Specifically, the diffuser plate spreads flow around it but also let's metered quantity of air flow through into its wake for improved flow distribution, thereby increasing the amount of fuel vapor which may be desorbed in the device. As a result, air may be introduced into the device at a high flowrate during purging without unduly increasing the pressure drop across the vapor storage device during purge operation, thereby decreasing losses in the device. As a result, the vapor storage device may be purged in a small period of time. This may be particularly useful in vehicles which may have a small window for purge operation, such as hybrid type vehicles. The aforementioned technical results have been achieved through specific geometries and positions of the dome and the diffuser plate which are described in greater detail herein. Moreover, the dome and the diffuser plate may not unduly increase pressure losses in the device.

Figure 1:
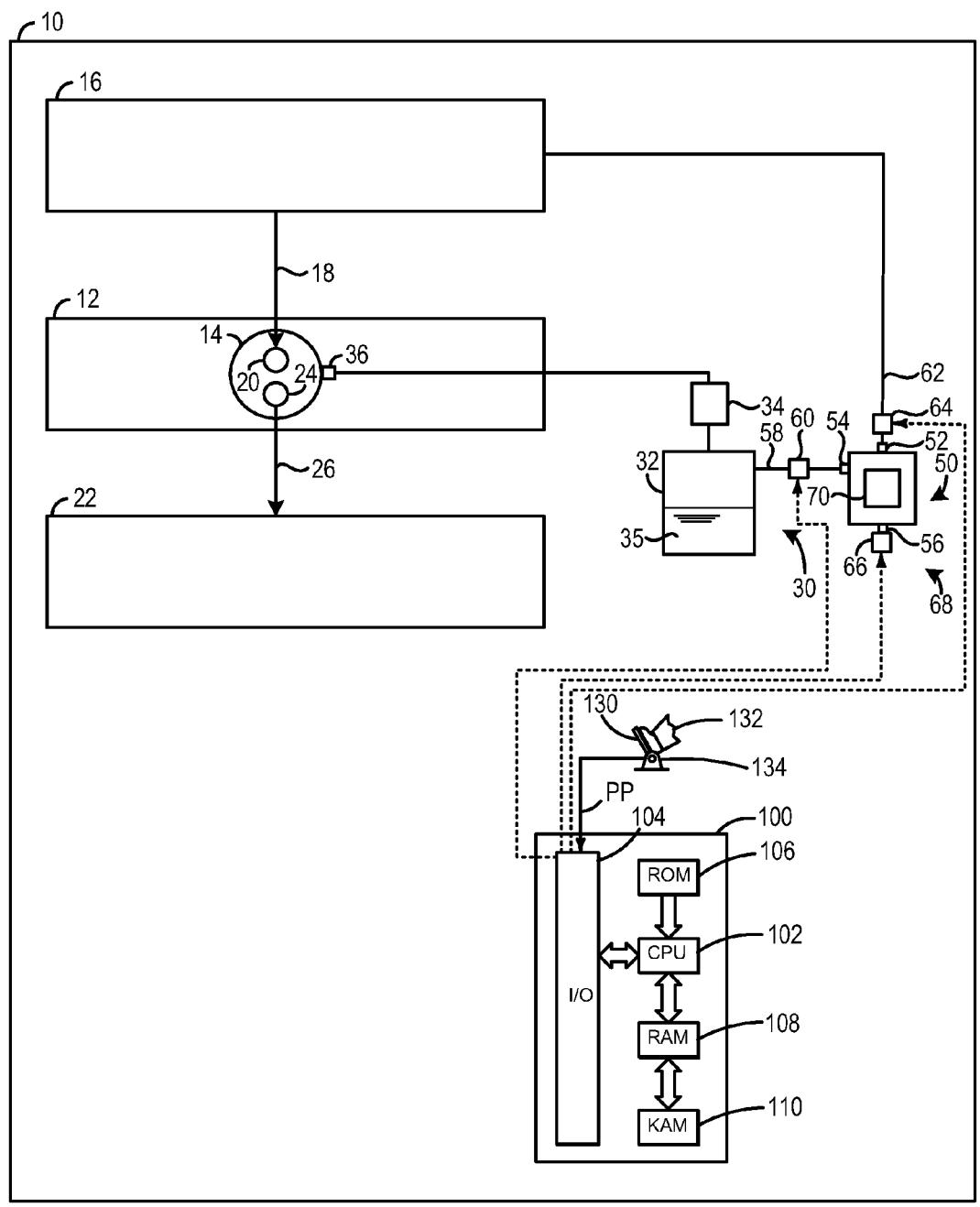
FIG. 1 shows a schematic depiction of a vehicle including a vapor storage device.

FIG. 1 shows a schematic depiction of a vehicle 10 including an engine 12. The engine 12 is configured to implement combustion operation. For example, a four stroke combustion cycle may be implemented including an intake stroke, a compression stroke, a power stroke, and an exhaust stroke. However, other types of combustion cycles may be utilized in other examples. In this way, motive power may be generated in the vehicle 10. It will be appreciated that the engine may be coupled to a transmission for transferring rotation power generated in the engine to wheels in the vehicle.

The engine 12 includes at least one cylinder 14. However, engines having different cylinder configurations have been contemplated. For instance, the cylinder may be arranged in an inline configuration where the cylinders are positioned in a straight line, a horizontally opposed configuration, a V-configuration, etc.

An intake system 16 is configured to provide air to the cylinder 14. The intake system 16 may include a variety of components for achieving the aforementioned functionality such as a throttle, an intake manifold, compressor, intake conduits, etc. As shown, the intake system 16 is in fluidic communication with the cylinder 14, denoted via arrow 18. It will be appreciated that one or more conduits, passages, etc., may provide the fluidic communication denoted via arrow 18. An intake valve 20 included in the intake system 16 may provide the fluidic communication between the intake system and the cylinder. The intake valve 20 may be cyclically opened and closed to implement combustion operation in the engine.

Furthermore, the engine further includes an exhaust system 22 configured to receive exhaust gas from the cylinder 14. The exhaust system may include manifolds, conduits, passages, emission control devices (e.g., catalysts, filters, etc.), mufflers, etc. An exhaust valve 24 coupled to the cylinder 14 is included in the exhaust system 22. The exhaust valve 24 may be configured to cyclically open and close during combustion operation. The exhaust system 22 is in fluidic communication with the cylinder 14, denoted via arrow 26. Specifically, arrow 26 may indicate exhaust passages, conduits, etc., providing fluidic communication between the cylinder 14 and the exhaust valve 24.

The vehicle 10 further includes a fuel delivery system 30. The fuel delivery system 30 having a fuel tank 32 and a fuel pump 34 configured to flow fuel to downstream components. Fuel pump 34 may be located internal or external to fuel tank 32. The fuel tank 32 stores a liquid fuel 35 (e.g., gasoline, diesel, ethanol, etc.). It will be appreciated, that fuel vapor may be generated above the liquid fuel. The amount of fuel vapor developed may be based on the temperature of the fuel tank and surrounding components, such as the engine. The fuel delivery system 30 further includes a fuel injector 36. The fuel injector 36 is shown directly coupled to the cylinder 14 providing what is known as direct injection. Additionally or alternatively, a port fuel injector may be included in the fuel delivery system configured to provide fuel to an intake conduit upstream of the intake valve.

The vehicle 10 further includes a vapor storage device 50. The vapor storage device 50 includes an outlet port (e.g. purge port) 52, a loading port 54, and an inlet port 56. The loading port 54 may be in fluidic communication with the fuel tank 32. A vapor line 58 provides the fluidic communication between the fuel tank 32 and the loading port 54. Valve 60 may regulate the fluidic communication between the loading port 54 in the vapor storage device 50 and the fuel tank 32. Specifically, the valve 60 may control the amount of fuel vapor flowing from the fuel tank 32 to the fuel vapor storage device 50. Thus, valve may selectively permit and inhibit fuel vapor flow between the fuel tank 32 and the vapor storage device 50.

The outlet port (e.g. purge port) 52 is in fluidic communication with the intake system 16. A vapor line 62 provides fluidic communication between the outlet port 52 and the intake system 16. It will be appreciated that the outlet of the vapor line 62 may be positioned downstream or upstream of a throttle and/or compressor. A valve 64 regulates the amount of vapor flow through the vapor line 62. Thus, the valve 64 is configured to selectively permit and inhibit fuel vapor flow between the intake system 16 and the vapor storage device 50. Valve 66 may be configured as a leak detection device (e.g., an open on-board diagnostics (OBD-II) leak detection device) and a valve. During certain operating conditions, such as during leak detection in a three port canister system, the valve 66 may be closed. In a five port canister system, the valve 66 may be configured to control a path of internal canister flow, depending on operating conditions. In the five port canister system the valve 66 may be closed, during certain operating conditions, and may be located at port 206. During refueling the valve 66 may be closed (e.g., not energized) and refueling vapors may enter the tank port 208 and air may exit the only port open to atmosphere (i.e., port 202). During engine operation the valve 66 may be commanded open to allow atmospheric pressurized air to enter ports 202 and 206 during purge, and exit the canister through ports 210 and 204.

The vapor storage device 50 may be included in a vapor storage system 68, in one example. However, in other examples the vapor storage device 50 may be conceptually included in the fuel delivery system 30. Additionally, the vapor storage device 50 may include carbon 70 (e.g., activated carbon) for capturing fuel vapors. The carbon may adsorb and desorb fuel vapor depending on the engine operating conditions. It will be appreciated that the vapor storage device 50 is schematically depicted and may include additional components such as a dome and a diffuser plate discussed in greater detail herein.

A controller 100 may be included in the vehicle. The controller 100 may be configured to receive signals from sensors in the vehicle as well as send command signals to components such as the valves (60, 64 and 66).

Various components in the vehicle 10 may be controlled at least partially by a control system including the controller 100 and by input from a vehicle operator 132 via an input device 130. In this example, input device 130 includes an accelerator pedal and a pedal position sensor 134 for generating a proportional pedal position signal PP. The controller 100 is shown in FIG. 1 as a microcomputer, including processor 102 (e.g., microprocessor unit), input/output ports 104, an electronic storage medium for executable programs and calibration values shown as read only memory 106 (e.g., read only memory chip) in this particular example, random access memory 108, keep alive memory 110, and a data bus. Storage medium read-only memory 106 can be programmed with computer readable data representing instructions executable by processor 102 for performing the methods described below as well as other variants that are anticipated but not specifically listed. As shown, the valves (60, 64 and 66) may receive control signals from the controller 100 to facilitate vapor storage device loading and purging, discussed in greater detail herein.

Figure 2:
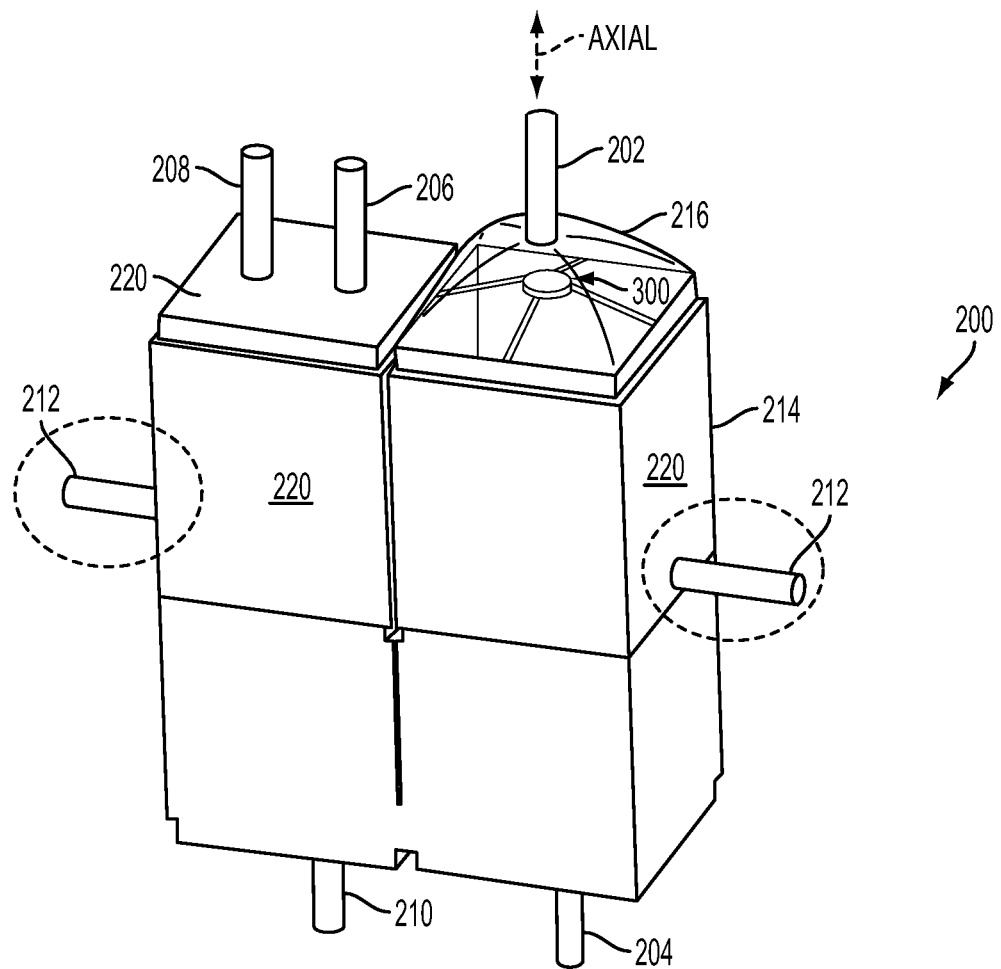
FIG. 2 shows an example vapor storage device.

FIG. 2 shows a perspective view of an example vapor storage device 200. It will be appreciated that the vapor storage device 200 may be similar to vapor storage device 50 and therefore may be included in the vehicle 10 shown in FIG. 1.

The vapor storage device 200 includes an inlet port 202 and an outlet port 204. The outlet port (e.g., purge port) 204 may be in fluidic communication with an intake system at a location upstream or downstream of a throttle. The inlet port 202 may be configured to receive fresh air. The inlet port 202 and the outlet port 204 are parallel to one another. However, other port orientations have been contemplated. Moreover, the diameter of the inlet port 202 is substantially equivalent to the diameter of the outlet port 204. However, in other example the ports (202 and 204) may have unequal diameters. The vapor storage device 200 further includes a loading port 206, a second inlet port 208, and a second outlet port 210. It will be appreciated that the loading port 206 may receive fuel vapor from a fuel delivery system. Likewise, the second outlet port 210 may be in fluidic communication with the intake system at a location downstream or upstream of a throttle and the second inlet port 208 may be configured to receive ambient air. In one example, the vapor storage device 200 further includes ports 212. These ports can be used as outlet ports for a 7-ports vapor storage system, such as the vapor storage system described in U.S. patent application Ser. No. 13/670,675 filed on Nov. 7, 2012. It will be appreciated that one or more of the ports 212 may be removed from the vapor storage device 200 in other examples.

The vapor storage device 200 further includes a housing 214 defining an enclosure. The housing 214 may include a plurality of side walls 220. The side walls 220 are substantially planar and arranged perpendicular to adjacent side walls. Thus, the housing forms a rectangular solid. However, other side wall geometries and orientations have been contemplated. For instance, conical type devices and circular type devices have been contemplated. Additionally, the ports (206 and 208) extend through one of the side walls 220. Specifically, the ports (206 and 208) are arranged perpendicularly to the side wall which they extend through. It will be appreciated that the aforementioned ports may provide inlet and outlet flow from the enclosure. Therefore, other than the aforementioned ports the enclosure may be substantially sealed. The housing may enclose carbon blocks configured to adsorb and desorb fuel vapor. The vapor storage device 200 may further include partitions dividing portions of the enclosure defined by the housing 214. The vapor storage device 200 also includes a dome 216 directly coupled to the inlet port 202. A diffuser plate 300 is also shown. It will be appreciated that the dome 216 at least partially encloses the diffuser plate 300. The dome 216 may be formed as a dome-shaped element (such as shown in FIG. 2) or conical. Specifically, the dome 216 axially extends away from the inlet port 202. An axial axis is provided for reference. The curvature of dome increase flow area gradually from inlet port 202 to diffuser plate 300. The geometry of the dome may help in reducing a dead-zone (i.e., no flow region) in the vapor storage device. Dead-zones can cause vortices and increase pressure loss. Hence, it may be advantageous to decrease amount of dead-zone using dome.

Figure 3:
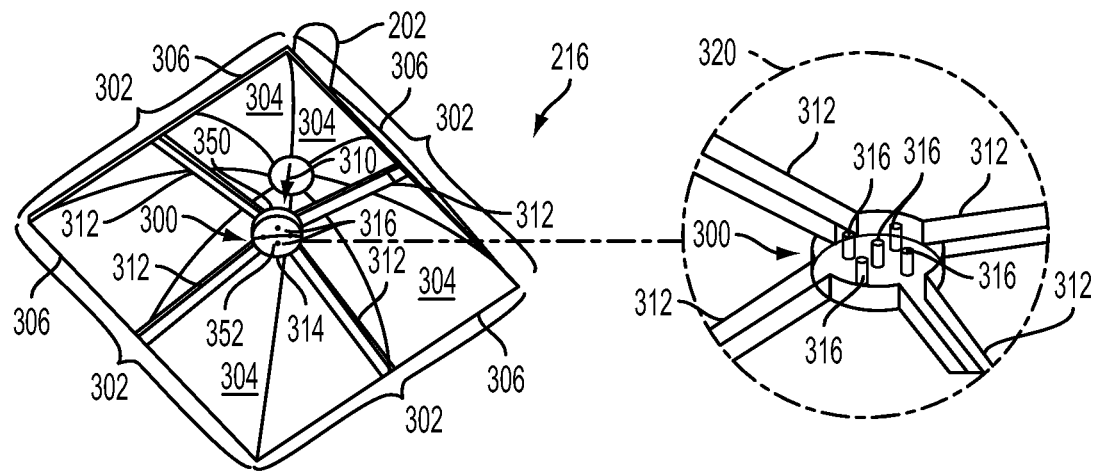
FIGS. 3-10 show different views of a diffuser plate and a dome included in the vapor storage device shown in FIG. 2.

FIG. 3 shows a detailed view of the dome 216 and a diffuser plate 300. The dome 216 includes a plurality of side walls 302. Specifically in the depicted example the dome 216 includes four side walls. The side walls are curved (e.g., convex) in the depicted example. Specifically, each of the side walls has equivalent curvature. However, in other examples the curvature of the side walls may vary. However, domes having an alternate number of side walls and geometries have also been contemplated. Each of the side walls 302 includes an interior surface 304 and an exterior surface 306. The inlet port 202 is also shown in FIG. 3. As illustrated the inlet port 202 opens into the dome 216. Additionally, the dome side walls may be convex or straight.

The diffuser plate 300 is also shown included in the vapor storage device. The diffuser plate 300 is spaced away from the side walls 302. Specifically, the diffuser plate 300 is positioned on a central axis 310 of the inlet port 202. In this particular example, the diffuser plate 300 is axially aligned with the central axis 310. However, in other examples the diffuser plate may be partially offset from the central axis. The diffuser plate 300 is coupled (e.g., attached) to the side walls 302 of the dome 216 via coupling legs 312. One of the legs 312 may be orthogonal to another of the legs 312. In an embodiment, each of the legs 312 is orthogonal to each and every other of the legs, when viewed axially. In one example, each leg may have a square cross-section. However, in another example, the legs may have rectangular, oval, circular, or airfoil shape cross-sections (e.g., cross-sectional shapes) and/or may have attachment points other than indicated in FIG. 2. Therefore, FIGS. 2 and 3 provide for a diffuser plate coupled to the dome via a plurality of coupling legs extending from a radial periphery of the diffuser plate to an interior surface of the dome, the coupling legs having square, conical, oval, airfoil, or semi-spherical cross-sectional shapes. The coupling legs 312 may be coupled together at a central location aligned with the central axis. The coupling legs 312 may be glued, welded, snap fastened, etc., to the dome 216. Additionally, the coupling legs 312 extend from a peripheral surface 314 of the diffuser plate 300 to the interior surfaces 304. The coupling legs 312 extend in a radial and axial direction from the diffuser plate. However, other coupling leg orientations and geometries have been contemplated. Additionally in one example, the number of coupling legs can be 2 to 6 and they can be perpendicular or at any other angle to each other.

The diffuser plate 300 also includes a plurality of openings 316 extending through the diffuser plate. It will be appreciated that the diffuser plate 300 may include one or more openings in another example. Further in another example, the diffuser plate may include 5 or less openings. Specifically, the openings 316 extend through the diffuser plate 300 from a leading edge 350 to a trailing edge 352 of the plate. The coupling legs may be attached to the leading edge of diffuser plate in one example. In the depicted example the openings 316 are axially aligned with the central axis 310. Thus, the openings are substantially parallel to the central axis 310. However, other openings orientations have been contemplated. Moreover, the diameter of each of the opening is substantially constant along their length in the depicted example. Further in other examples, the diameter of the openings may vary along their length. An expanded view of the diffuser plate 300 and the coupling legs 312 is shown at 320. A total of four coupling legs are shown in the depicted example. However, vapor storage devices with alternate number of legs have been contemplated. It will be appreciated that the coupling legs 312 extend in an axial and radial direction. However, other coupling leg geometries have been contemplated. A diffuser plate with between 1 and 9 openings has been considered. It will be appreciated that in the depicted example the diffuser plate 300 include 5 openings. Additionally, the ratio of the sum of the cross-sectional surface area of the inlets of the openings and the total surface area of the leading side of the diffuser plate 300 may be between 0.05 and 0.2. The leading side of the diffuser plate is the side of the diffuser plate closest to the inlet port. In this way, a desired amount of airflow may pass through and around the diffuser plate providing desired flow distribution in the device.

Figure 4:
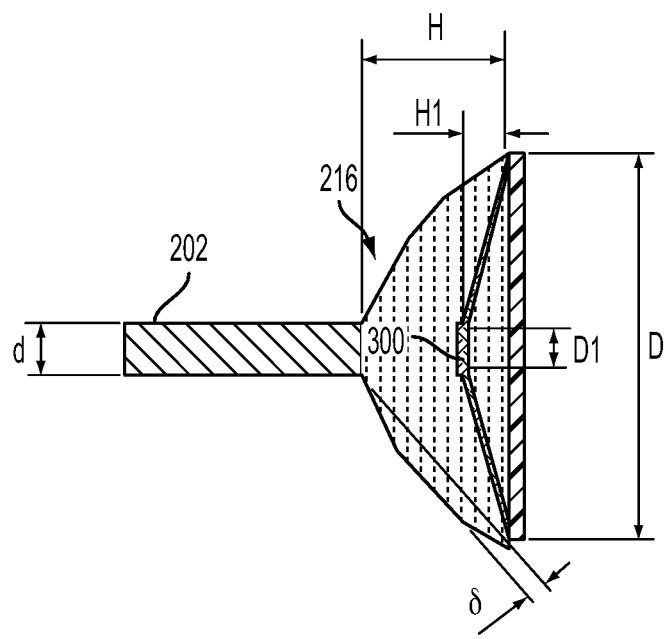

FIG. 4 shows a side view of the inlet port 202, the dome 216, and the diffuser plate 300. The diameter (d) of the inlet port 202 is depicted. Likewise, the diameter (D1) of the diffuser plate 300 is shown, the ratio between D1 and d (i.e., D1/d) may be in the range 0.95-1.1. It has been found through extensive experimentation and fluid dynamic analysis that the aforementioned ratio range may be needed to achieve desired purge flow characteristics in the device. Desired purge flow characteristics may include flow conditions where similar air velocity and mass flow rate in a core/central region of canister chamber as well as peripheral region (e.g., near wall region) of chamber are achieved. Desired purge flow characteristics may further include decreasing (e.g., minimizing) flow turning and smooth variation in flow diameter in device to reduce pressure losses. Desired purge flow characteristics may also include a reducing (e.g., substantially eliminating) reverse flow conditions in the device. The reverse flow condition may include a flow condition when air flows from out of an inlet port and/or into an outlet port. The height (H) of dome 216 and the height (H1) of the diffuser plate 300 are also shown. The heights of the respective components may be measured from the base of dome 216 to the leading or trailing edge of the component. The ratio of H1/H may be in the range of 0.25-0.4. This ratio range may also be needed to achieve desired purge characteristics in the device. Additionally, the curvature ($\delta$) of the dome 216 is between 0 and 13.5 millimeters (mm). The curvature ($\delta$) may be defined as a camber of dome. The curvature may be maximum deviation of dome convex surface from the line joining two end-points of dome.

The outer diameter D of the dome 216 is also shown. In one example, the outer diameter of the dome (D) may be 101.6 millimeters (mm). The outer diameter D of the dome may be controlled by the dimensions of the canister side walls 220. When the dome, inlet port, and/or diffuser plate have the aforementioned relative dimensions a desired flow distribution of the incoming air from the inlet port may be achieved in the vapor storage device. Additionally, the openings 316, shown in FIG. 3, allow a metered amount of air to travel through the diffuser plate, enabling flow distribution to be improved in the wake of the diffuser plate. It will be appreciated that the aforementioned geometries enable uniform air flow distribution without unduly increasing the pressure drop across the vapor storage device during purge operation, thereby decreasing losses in the device. Specifically, high velocity flow entering from inlet port may strike the diffuser plate which scatters or diverts it towards the space between dome and diffuser plate (i.e., away from central axis). At the same time, openings in the diffuser plate allow a desired amount of air to go axially through the plate to reduce (e.g., eliminate) dead zone formation in the wake of plate. If the size of the diffuser plate is too small, air may flow past the plate without spreading into the chamber. Hence, purging may only happen in core/center region of canister, when the size of the diffuser plate is too small. On the other hand, if diffuser plate is too big, air may strike the plate, get diverted towards chamber walls and flow to the outlet along the walls. In that case, purging may only happens in very narrow region along the walls. Additionally, this may create either no air flow or negative air flow in the core region of canister which can increase bleed emissions. So, when the size of the diffuser plate is too small or too big, it may result in decreased purging efficiency and high bleed emissions. Hence, geometrical features described herein help generate uniform flow distribution in the chamber. Uniform flow distribution may clean activated carbon in core as well as peripheral regions of chamber and it moves fuel vapor/hydrocarbon away from inlet port towards outlet port. This phenomenon increases purge efficiency and reduces bleed emissions. Moreover, since only small amount of air passes through narrow holes in the diffuser plate, pressure losses across the canister does not increase.

Figure 5:
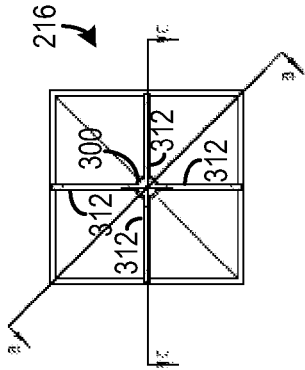
Figure 6:
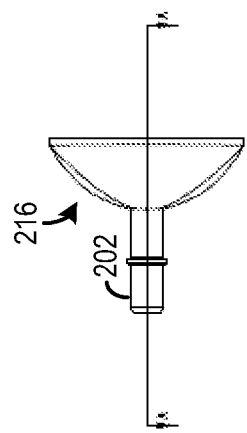

FIG. 5 shows a side view of the dome 216 and inlet port 202. Cutting plane A-A defines the cross-section shown in FIG. 7. FIG. 6 shows a bottom view of the dome 216, the diffuser plate 300, and the coupling legs 312. Cutting plane B-B defines the cross-section shown in FIG. 8 and cutting plane C-C defines the cross-section shown in FIG. 9. The coupling legs 312 are also shown in FIG. 6. All four coupling legs 312 are perpendicular to each other. However, other coupling legs positions and orientations have been contemplated.

Figure 7:
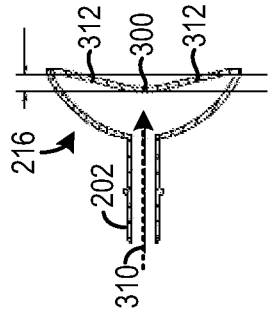

FIG. 7 shows a cross-sectional view of the inlet port 202, the dome 216, the diffuser plate 300, and the coupling legs 312. As shown, the diffuser plate 300 is axially aligned with a central axis of the inlet port 202. This alignment enables the diffuser plate to generate a desired amount of flow distribution in the interior region of the device.

Figure 8:
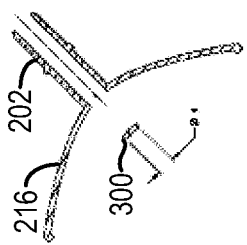

FIG. 8 shows another cross-sectional view of the inlet port 202, the dome 216, and the diffuser plate 300. As shown, the diffuser plate 300 is spaced away from the dome 216.

Figure 9:
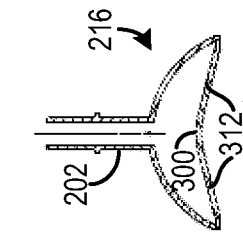

FIG. 9 shows another cross-sectional view of the inlet port 202, the dome 216, the diffuser plate 300, and the coupling legs 312.

Figure 10:
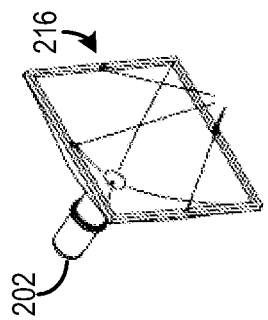

FIG. 10 shows only the dome 216 and the inlet port 202. Diffuser plate is assembled with dome via coupling legs.

Figure 11:
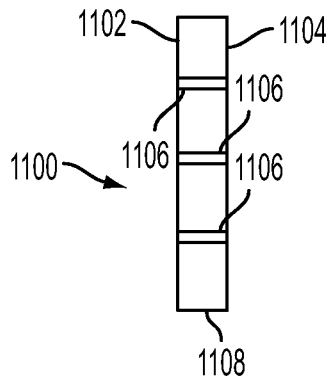
FIGS. 11-15 show different example diffuser plates.

FIGS. 11-15 show different example diffuser plates. It will be appreciated that the domes shown in FIGS. 11-15 may be included in the vapor storage device 200 shown in FIG. 2. Specifically, FIG. 11 shows a disk shaped diffuser plate 1100. The diffuser plate 1100 has a leading side 1102 and a trailing side 1104. The leading side 1102 and the trailing side 1104 may be substantially identical in size and geometry. Specifically, the sides may have a circular shape. Additionally, openings 1106 extend through the diffuser plate 1100. The openings 1106 are cylindrical in shape. In one example, the openings 1106 may have a 1 mm diameter. The diffuser plate 1100 also includes a peripheral edge 1108. The peripheral edge is circular in shape.

Figure 12:
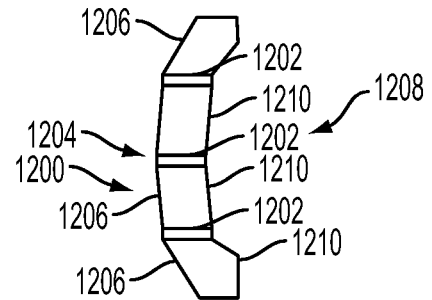

FIG. 12 shows another example diffuser plate 1200. As shown, the diffuser plate 1200 is concave and includes a plurality of openings 1202. Specifically, the diffuser plate 1200 includes a front side 1204 having a plurality of planar surfaces 1206 and a rear side 1208 having a plurality of planar surfaces 1210.

Figure 13:
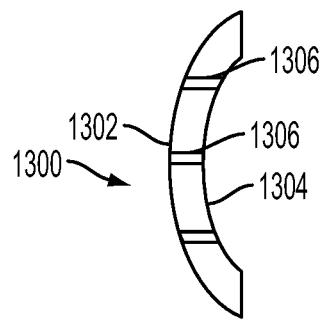

FIG. 13 shows another example diffuser plate 1300. As shown the diffuser plate 1300 is concave. The diffuser plate 1300 includes a front surface 1302, a trailing surface 1304, and a plurality of openings 1306 extending through the plate.

Figure 14:
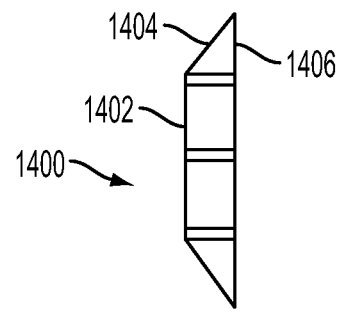

FIG. 14 shows another example diffuser plate 1400. The diffuser plate 1400 includes a front surface 1402, a peripheral surface 1404, and a trailing surface 1406. The front surface 1402 is smaller than the trailing surface 1406. Additionally, the diameter of the peripheral surface 1404 increases in a downstream direction. Therefore, it will be appreciated that the diffuser plate 1400 has a conical geometry.

Figure 15:
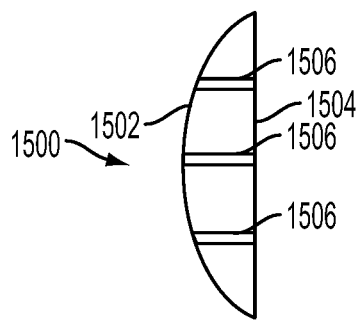

FIG. 15 shows another example diffuser plate 1500. As shown, the diffuser plate 1500 has a curved leading surface 1502 and a planar trailing surface 1504. Additionally, the diffuser plate 1500 includes a plurality of openings 1506. The diffuser plate 1500 has a semi-spherical geometry. That is to say that the diffuser plate 1500 has the curvature of a sphere which has been cut along a latitude line of the sphere. For high flow rate applications, imparting some curvature to leading/front surface of the diffuser plate, such as in the diffuser plates shown in FIGS. 11-13 and 15 or reducing an area of a front surface of the diffuser plate, such as the diffuser plate shown in FIG. 14, reduces drag force on the diffuser plate. This may result into generation small wake behind the plate and lower stresses on coupling legs 312, shown in FIG. 6 for example.

Figure 16:
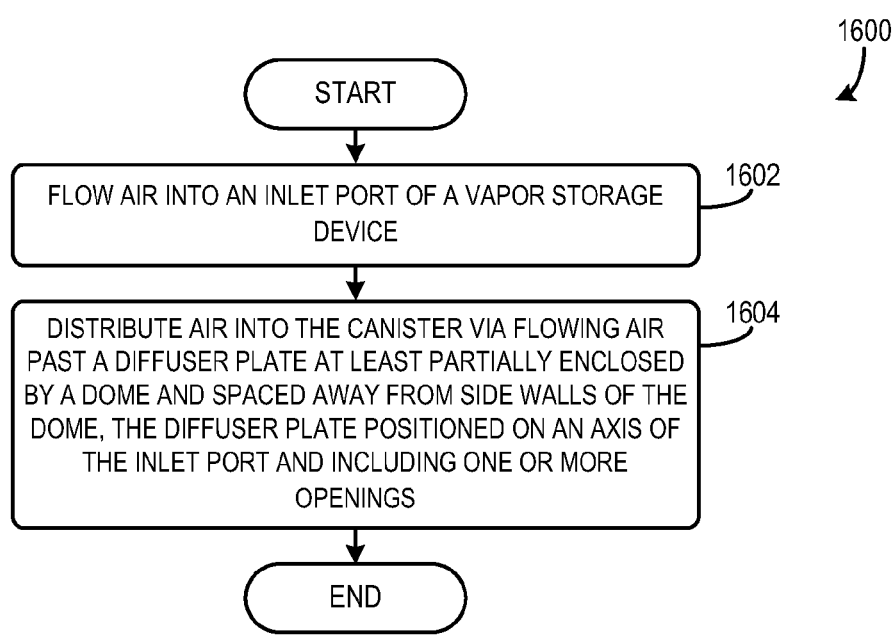
FIG. 16 shows a method for operation of a vapor storage device.

FIG. 16 shows a method 1600 for operation of a vapor storage device. The method 1600 may be implemented via the vapor storage devices discussed above with regard to FIGS. 1-15 or may be implemented via other suitable vapor storage devices.

At 1602 the method includes flowing air into an inlet port of a vapor storage device. Next at 1604 the method includes distributing air into the canister via flowing air past a diffuser plate at least partially enclosed by a dome and spaced away from side walls of the dome, the diffuser plate positioned on an axis of the inlet port and including one or more openings. In one example the openings are axially aligned with regard to the inlet port. Further, it will be appreciated that the steps 1602 and 1604 may be implemented after it is determined that fuel vapor purge operation should be implemented in an engine.

Figure 17:
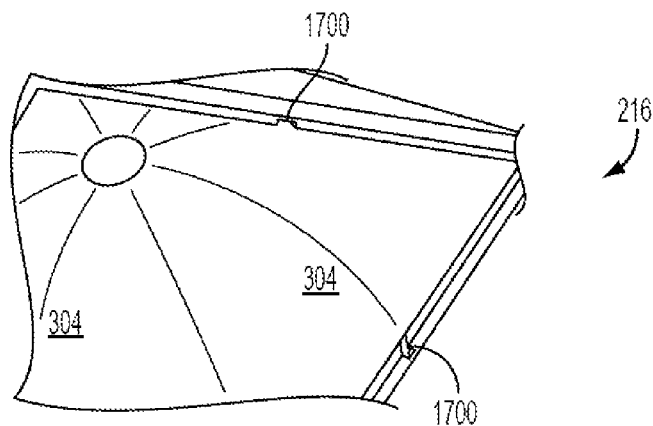
FIG. 17 shows another view of the diffuser plate and the dome shown in FIG. 2.

FIG. 17 shows another view of the dome 216. The diffuser plate and the coupling legs are not shown in FIG. 17. As illustrated, coupling leg interfaces 1700 are included in the dome 216. The coupling leg interfaces 1700 have a square geometry, in the depicted example. However, other coupling leg interface geometries have been contemplated. The coupling leg interfaces 1700 enable the coupling legs to be attached to the dome 216. Specifically in the depicted example, coupling legs may snap into the coupling leg interfaces. Specifically, the coupling legs can be snapped in the dome or canister side wall or attached with a compression plate. However, other coupling techniques have been contemplated. The coupling leg interfaces 1700 are included in the interior surfaces 304 of the side walls of the dome.

Figure 18:
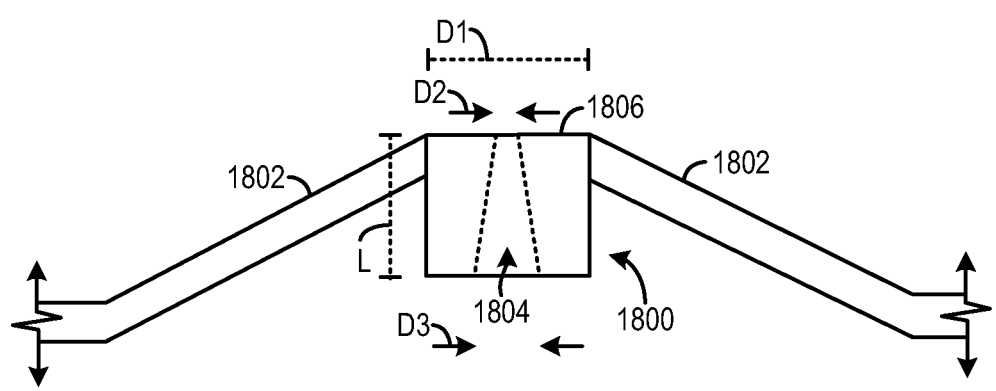
FIG. 18-19 shows another example diffuser plate and coupling legs.

FIG. 18 shows another example diffuser plate 1800 and coupling legs 1802. As shown, the coupling legs 1802 are attached to the leading edge 1806 of the diffuser plate 1800. It will be appreciated that the coupling legs may be attached to a dome in a vapor storage device. The diffuser plate 1800 includes an opening 1804 axially extending through the plate. The opening 1804 is conical in shape in the depicted example. As shown, the inlet of the opening 1804 has a smaller diameter than the outlet of the opening. It will be appreciated that air from the dome may flow into the inlet of the opening in the diffuser plate. It will be appreciated that in some examples, the diffuser plate may include a plurality of openings, such as up to five openings. Each of the openings may have a similar geometry, in one example. However in other examples, the geometries of the openings may vary. The length L of the diffuser plate 1800 may be between 8-12 millimeters (mm). The diameter D3 of the inlet of the opening 1804 may be 1 mm-4 mm, in one example. The ratio of the diameter D2 of the outlet of the opening 1804 and the diameter D3 of the inlet of the opening 1804 (D2/D3) may be 1.2-3.5, in one example. Therefore, the ratio of the diffuser plate opening diameter at inlet and outlet is in the range of 1.2 to 3.5.

Figure 19:
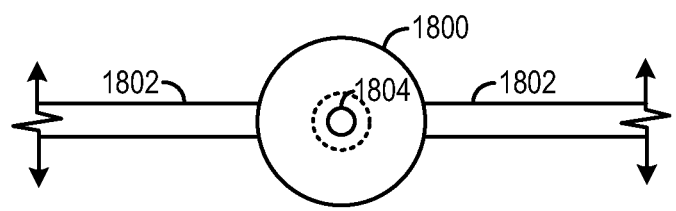

FIG. 19 shows another view of the diffuser plate 1800 and the coupling legs 1802 shown in FIG. 18. The opening 1804 in the diffuser plate 1800 is also shown in FIG. 19. As discussed above with regard to FIG. 18 the inlet of the opening 1804 is smaller in diameter than the outlet of the opening. Therefore, the opening has a conical shape. The opening provides desired flow characteristics to the vapor storage device. Therefore in one example at least one of the one or more openings in the diffuser plate may include an opening inlet having a smaller diameter than an opening outlet (i.e. opening diverging from leading edge to trailing edge of diffuser plate).

FIGS. 1-19 provide for a vapor storage device where the diffuser plate is coupled to the dome via one or more coupling legs extending from a radial periphery of the diffuser plate to an interior surface of the dome, or vapor storage device walls extending from the dome, where the coupling legs are each attached to an interior surface of a different side wall or a compression plate.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vapor storage device comprising:
   a diffuser plate positioned on an axis of an inlet port and comprising one or more openings extending through the plate from a leading edge to a trailing edge; and
   a dome coupled to the inlet port of the device and the diffuser plate, where the dome includes side walls spaced away from the diffuser plate;
   where at least one of the one or more openings in the diffuser plate includes an opening inlet having a smaller diameter than an opening outlet.

2. The vapor storage device of claim 1, where the diffuser plate is axially aligned with a central axis of the inlet port.

3. The vapor storage device of claim 1, where the dome side walls are curved and extend to the inlet port.

4. The vapor storage device of claim 3, where the dome side walls are convex.

5. The vapor storage device of claim 1, where the diffuser plate openings are axially aligned.

6. The vapor storage device of claim 1, where the diffuser plate is coupled to the dome via one or more coupling legs extending from a radial periphery of the diffuser plate to an interior surface of the dome, or vapor storage device walls extending from the dome, where the coupling legs are each attached to an interior surface of a different side wall or a compression plate.

7. The vapor storage device of claim 1, where the diffuser plate is disk shaped.

8. The vapor storage device of claim 1, where the diffuser plate has a convex cross-section.

9. The vapor storage device of claim 1, where the diffuser plate includes a peripheral surface having a conical geometry.

10. The vapor storage device of claim 1, where the diffuser plate is semi-spherical in geometry.

11. The vapor storage device of claim 1, where a curvature ($\delta$) of the dome is between 0 and 13.5 millimeters (mm) and where the diffuser plate is coupled to the dome via a plurality of coupling legs extending from a radial periphery of the diffuser plate to an interior surface of the dome, the coupling legs having square, conical, oval, airfoil, or semi-spherical cross-sectional shapes.

12. The vapor storage device of claim 1, where the diffuser plate is coupled to the dome via a plurality of coupling legs extending from a radial periphery of the diffuser plate to an interior surface of the dome and where a number of coupling legs includes between 2 to 6 legs.

13. The vapor storage device of claim 1, where coupling legs are configured to be snapped in the dome or a canister side wall or attached with a compression plate.

14. The vapor storage device of claim 1, where the diffuser plate includes 5 or less openings.

15. The vapor storage device of claim 1, where a ratio of the diffuser plate opening diameter at inlet and outlet is in the range of 1.2 to 3.5.

16. The vapor storage device of claim 1, where coupling legs are attached to the leading edge of the diffuser plate.

17. A method for operation of a vapor storage device comprising:
flowing air into an inlet port of a vapor storage device; and
distributing air into a canister via flowing air past a diffuser plate at least partially enclosed by a dome and spaced away from side walls of the dome, the diffuser plate positioned on an axis of the inlet port and including one or more openings;
where at least one of the one or more openings in the diffuser plate includes an opening inlet having a smaller diameter than an opening outlet.

18. The method of claim 17, where the diffuser plate openings are axially aligned with regard to the inlet port.

19. A vapor storage device comprising:
an inlet port receiving air during certain operating conditions, the inlet port opening into a dome, the dome including side walls directly coupled to the inlet port and axially extending away from the inlet port; and
a diffuser plate at least partially enclosed by the dome and axially aligned with a central axis of the inlet port and including one or more openings extending from a leading edge of the diffuser plate to a trailing edge of the diffuser plate;
where at least one of the one or more openings in the diffuser plate includes an opening inlet having a smaller diameter than an opening outlet.

20. The vapor storage device of claim 19, where the diffuser plate is disk shaped.

* * * * *